US012719697B2

(12) United States Patent
Armleder

(10) Patent No.: US 12,719,697 B2
(45) Date of Patent: Aug. 25, 2026

(54) METHOD FOR DIGITAL SIGNING AND CORRESPONDING SYSTEM

(71) Applicant: Sebastien Armleder, Carouge (CH)

(72) Inventor: Sebastien Armleder, Carouge (CH)

(73) Assignee: Sebastien Armleder, Carouge (CH)

( * ) Notice: Subject to any disclaimer, the term of this patent is extended or adjusted under 35 U.S.C. 154(b) by 151 days.

(21) Appl. No.: 18/854,295

(22) PCT Filed: Mar. 23, 2023

(86) PCT No.: PCT/EP2023/058034
§ 371 (c)(1),
(2) Date: Oct. 4, 2024

(87) PCT Pub. No.: WO2023/194161
PCT Pub. Date: Oct. 12, 2023

(65) Prior Publication Data

US 2025/0150284 A1 May 8, 2025

(30) Foreign Application Priority Data

Apr. 8, 2022 (EP) .................................... 22167467

(51) Int. Cl.
*H04L 9/32* (2006.01)

(52) U.S. Cl.
CPC .................................. *H04L 9/3247* (2013.01)

(58) Field of Classification Search
CPC ..................................................... H04L 9/3247
(Continued)

(56) References Cited

U.S. PATENT DOCUMENTS

2020/0311289 A1* 10/2020 Cooper ................. G06F 21/602
2020/0351657 A1* 11/2020 Wentz .................. H04L 9/3231
(Continued)

FOREIGN PATENT DOCUMENTS

CN 102281143 B 4/2015
EP 2380149 B1 10/2016
EP 3008852 B1 4/2019

OTHER PUBLICATIONS

International Search Report received Jun. 6, 2023 in International Application PCT/EP2023/058034.

*Primary Examiner* — Dereena T Cattungal
(74) *Attorney, Agent, or Firm* — ALG Intellectual Property, LLC

(57) ABSTRACT

A method for digital signing includes sending an authentication from a user device to a data processing apparatus; checking the authentication; in response to successfully checking the authentication, generating a remote authentication element; sending the remote authentication element to the user device; sending the remote authentication element and at least one data structure to a remote data processing system; receiving from the remote data processing system a signing element; sending the signing element and a second authentication to the data processing apparatus; providing at least one data element to the data processing apparatus, wherein each data element is derived by one of the at least one data structure, respectively; checking the second authentication and evaluating the signing element; and in response to successfully checking the second authentication and successfully evaluating the signing element, signing each of the at least one data element with a private signature key.

16 Claims, 8 Drawing Sheets

(58) Field of Classification Search
USPC .......................................................... 713/176
See application file for complete search history.

(56) References Cited

U.S. PATENT DOCUMENTS

| | | | | |
|---|---|---|---|---|
| 2021/0150520 | A1* | 5/2021 | Geraud | G06Q 20/3825 |
| 2022/0147974 | A1* | 5/2022 | Law | G06F 21/34 |
| 2022/0158855 | A1* | 5/2022 | Wentz | H04L 9/3247 |

* cited by examiner

METHOD FOR DIGITAL SIGNING AND CORRESPONDING SYSTEM

The present invention relates to a method for digital signing and a corresponding system.

Digital signatures are used in a plurality of ways. For example, digital signatures are used to transfer crypto assets. For example, in case a user wishes to transfer an amount of 1 Bitcoin from their funds to another user, a transaction may be generated indicating the address of the sender, the address of the receiver, and the type (Bitcoin) and value (1 unit) to be transferred. These details may be an example for a data structure. Based on the data structure, a data element may be derived, e.g., a hash of the data structure, and the user may sign this data structure using their private key corresponding to the public key associated with the crypto assets of the user. The user may then broadcast the signed data element, i.e., the signed hash of the transaction to a blockchain, which is then registered to effect the transfer. While this is a specific example, it should be understood that this is merely exemplary and that digital signatures can also be used in a plurality of other ways, e.g., to transfer other crypto currencies, to transfer non fungible tokens, or to sign digital contracts.

While different solutions for digital signatures exist, there is still a need for additional technologies being improved as regards security and ease of use.

In view of the above, it is an object of the present invention to provide further and improved options for digital signing, and this object is met by the present invention.

In a first aspect, the present invention relates to a method for digital signing. The method comprises sending an authentication from a user device to a data processing apparatus; the data processing apparatus checking the authentication; in response to the data processing apparatus successfully checking the authentication, the data processing apparatus generating a remote authentication element; the data processing apparatus sending the remote authentication element to the user device; the user device sending the remote authentication element and at least one data structure to a remote data processing system; the user device receiving from the remote data processing system a signing element; the user device sending the signing element and a second authentication to the data processing apparatus; providing at least one data element to the data processing apparatus, wherein each data element is derived by one of the at least one data structure, respectively; the data processing apparatus checking the second authentication and evaluating the signing element; and in response to the data processing apparatus successfully checking the second authentication and successfully evaluating the signing element, the data processing apparatus signing each of the at least one data element with a private signature key, thereby generating at least one signed data element.

It will thus be understood that embodiments of the present invention employ three data processing devices, namely the user device, the data processing apparatus (which may be a smart card) and the remote data processing system. For example, the user device may communicate with the data processing apparatus by means of near field communication and with the remote data processing system via internet protocols.

In particular, it will be understood that to improve security, the user device sends two authentications to the data processing apparatus. The first authentication (if successful) triggers the generation of a remote authentication element, which is then sent to the remote data processing system, together with the at least one data structure (which may indicate the transaction details of a crypto transaction). The remote data processing system may, e.g., after checking a validity of the remote authentication element and checking the data structure, send a signing element back to the user device.

The user device may send this signing element and the second authentication to the data processing apparatus. Furthermore, also at least one data element derived from the at least one data structure is provided to the data processing apparatus. For example, when the data structure are the details of a crypto transaction, the data element may be a hash of the data structure. After successfully evaluating the signing element and the authentication, the data processing apparatus signs the at least one data element.

In particular, this method allows that the at least one data structure is checked by the remote data processing system, which may be independent from the user. For example, it may be a remote server run by a financial institution. The described method thus allows that the at least one data structure is checked for compliance. For example, in case the data structure refers to a crypto transaction, the remote data processing system may check whether the sender is allowed to send the respective crypto asset and whether the receiver is allowed to receive the respective crypto asset. In case the details of the data structure are not fully compliant, the signing element may not be generated. This thus allows a high level of compliance.

Furthermore, the described method also improves the security for the user. Consider, e.g., that the user loses the data processing apparatus (which may be a smart card). In this case, the user may notify the operator of the remote data processing system and the sender address may be blocked. Thus, any future transaction (while the sender address is blocked) may not be possible, as no signing element would be generated by the remote data processing system.

It will further be understood that the present invention may allow for the remote data processing system (e.g., the remote server) to remotely allow conditionally the user access to their private key (or plurality of private keys) that are in their data processing apparatus (e.g., smartcard). That is, a signing functionality of the data processing apparatus may be controlled by means of the remote data processing system. This may be beneficial compared to, e.g., using a system where the private keys themselves are remotely available for signature online, which would be very difficult to secure. Overall, embodiments of the present invention may thus provide a secure and simple way of controlling a signing functionality of the data processing apparatus without exposing access to the private signature key online.

The method may further comprise the user device generating the at least one data structure.

The method may further comprise deriving the at least one data element based on the at least one data structure.

The user device may derive the at least one data element based on the at least one data structure.

Providing the at least one data element to the data processing apparatus may comprise the user device sending the at least one data element to the data processing apparatus.

The data processing apparatus may derive the at least one data element based on the at least one data structure.

Providing the at least one data element to the data processing apparatus may comprise the user device sending the at least one data structure to the data processing apparatus and the data processing apparatus deriving the at least one data element based on the at least one data structure.

The method may further comprise sending the at least one signed data element from the data processing apparatus to the user device.

The method may further comprise the user device broadcasting the at least one signed data element to a blockchain.

The method may further comprise the user device broadcasting the at least one data structure to the blockchain.

The method may further comprise the remote data processing system performing a compliance check on each of the at least one data structure, and the remote data processing system checking the remote authentication element.

The method may further comprise in response to a successful compliance check and a successful check of the remote authentication element, the remote data processing system generating the signing element and sending the signing element to the user device.

The at least one data structure is a data structure and the at least one data element may be a data element.

That is, the at least one data structure may be a single data structure and the at least one data element may be a single data element.

The data processing apparatus generating the remote authentication element may comprise the data processing apparatus signing the data element with a private remote access key, thereby generating a remote access data element forming the remote authentication element.

The data processing apparatus may comprise a secure portion.

The secure portion may also be referred to as secure enclave. The secure portion can provide hardware and software protection for maintaining the secrecy of data in the secure portion. More particularly, the data processing apparatus (e.g., the smart card) can be programmed so that only defined data may leave the secure portion, while other data cannot leave the secure portion. The secure portion can comprise one or more secure microcontroller and one or more secure memory components. It should be understood that when it is said in this document that data is stored in the secure portion, this data cannot be retrieved from the secure portion.

The private remote access key may be stored in the secure portion.

The private signature key may be stored in the secure portion.

The signing element may be an issuer signed data element obtained by signing the data element with an issuer private key.

The data processing apparatus may comprise an issuer public key corresponding to the issuer private key, and evaluating the signing element may comprise checking with the issuer public key whether the issuer signed data element is the data element signed with the issuer private key.

The issuer public key may be stored in the secure portion.

The method may further comprise the remote data processing system deriving the data element from the data structure.

The remote data processing system may comprise a public remote access key corresponding to the private remote access key, and the remote data processing system checking the remote authentication element may comprise the remote data processing system checking with the public remote access key whether the remote access data element is the data element signed with the private remote access key.

The remote data processing system generating the signing element may comprise the remote data processing system signing the data element with the issuer private key to thereby generate the issuer signed data element.

The at least one data structure may be a plurality of data structures and the at least one data element may be a plurality of data elements.

It will thus be understood that in embodiments of the present technology, not only a single data structure and a single data element is used, but that a plurality of such data structure and a plurality of data elements are used.

This may greatly increase the efficiency of the technology. In particular, instead of sending single elements between the different entities (i.e., the user device, the data processing apparatus and the remote data processing system), always a combination of these elements may be sent between these entities. Further, by using a plurality of data structures and data elements in the present technology, with a single use of the present method (in particular: a single first authentication and a single second authentication), signing a plurality of data elements may be triggered, improving the efficiency of the present method.

The method may further comprise providing a meta data element to the data processing apparatus, wherein the meta data element is generated by concatenating the data elements and deriving the meta data element based on the concatenated data elements.

Overall, it should be understood that the meta data element can be provided to the data processing apparatus by the meta data element being generated on the data processing apparatus, or by the meta data element being generated elsewhere (e.g., in the user device) and then being sent to the data processing apparatus.

Concatenating the data elements may be performed by the user device.

Deriving the meta data element may be performed by the user device.

Deriving the meta data element may be performed by the data processing apparatus.

Concatenating the data elements may be performed by the data processing apparatus.

The data processing apparatus generating the remote authentication element may comprise the data processing apparatus signing the meta data element with a private remote access key, thereby generating a remote access meta data element forming the remote authentication element.

The private remote access key may be stored in the secure portion.

The signing element may be an issuer signed meta data element obtained by signing the meta data element with an issuer private key.

The data processing apparatus may comprise an issuer public key corresponding to the issuer private key, and evaluating the signing element may comprise checking with the issuer public key whether the issuer signed meta data element is the meta data element signed with the issuer private key.

The issuer public key may be stored in the secure portion.

The method may further comprise the remote data processing system deriving the plurality of data elements from the plurality of data structures, and the remote data processing system concatenating the plurality of data elements and deriving the meta data element based on the concatenated data elements.

The remote data processing system may comprise a public remote access key corresponding to the private remote access key, and the remote data processing system checking the remote authentication element may comprise the remote data processing system checking with the public remote access key whether the remote access meta data element is the meta data element signed with the private remote access key.

The remote data processing system generating the signing element may comprise the remote data processing system signing the meta data element with the issuer private key to thereby generate the issuer signed meta data element.

The data processing apparatus may be a smart card.

The user device and the data processing apparatus may communicate with each other via near field communication.

In a second aspect, the present invention also relates to a system configured to perform the method, wherein the system comprises the user device and the data processing apparatus.

It should be understood that when a system is said to be configured to perform the method discussed above, this means that the components of the system are programmed to perform the respective steps of the method.

The system may comprise the remote data processing system.

The present invention is also defined by the following numbered embodiments.

M1. A method for digital signing, wherein the method comprises
- sending an authentication (Auth) from a user device (100) to a data processing apparatus (200),
- the data processing apparatus (200) checking the authentication (Auth),
- in response to the data processing apparatus (200) successfully checking the authentication (Auth), the data processing apparatus (200) generating a remote authentication element (60, 42, 82),
- the data processing apparatus (200) sending the remote authentication element (60, 42, 82) to the user device (100),
- the user device (100) sending the remote authentication element (60, 42, 82) and at least one data structure (2, 2*a*, 2*b*, 2*c*) to a remote data processing system (300),
- the user device (100) receiving from the remote data processing system (300) a signing element (62),
- the user device (100) sending the signing element (62, 44, 84) and a second authentication (Auth) to the data processing apparatus (200),
- providing at least one data element (4, 4*a*, 4*b*, 4*c*) to the data processing apparatus (200), wherein each data element (4, 4*a*, 4*b*, 4*c*) is derived by one of the at least one data structure (2, 2*a*, 2*b*, 2*c*), respectively,
- the data processing apparatus (200) checking the second authentication (Auth) and evaluating the signing element (62, 44, 84), and
- in response to the data processing apparatus (200) successfully checking the second authentication (Auth) and successfully evaluating the signing element (62, 44, 84), the data processing apparatus (200) signing each of the at least one data element (4, 4*a*, 4*b*, 4*c*) with a private signature key (58), thereby generating at least one signed data element (46).

M2. The method according to embodiment M1, wherein the method further comprises
- the user device (100) generating the at least one data structure (2, 2*a*, 2*b*, 2*c*).

M3. The method according to any of the preceding embodiments, wherein the method further comprises
- deriving the at least one data element (4, 4*a*, 4*b*, 4*c*) based on the at least one data structure (2, 2*a*, 2*b*, 2*c*).

M4. The method according to the preceding embodiment, wherein
- the user device (100) derives the at least one data element (4, 4*a*, 4*b*, 4*c*) based on the at least one data structure (2, 2*a*, 2*b*, 2*c*).

M5. The method according to the preceding embodiment, wherein
- providing the at least one data element (4, 4*a*, 4*b*, 4*c*) to the data processing apparatus (200) comprises the user device (100) sending the at least one data element (4, 4*a*, 4*b*, 4*c*) to the data processing apparatus (200).

M6. The method according to embodiment M3, wherein
- the data processing apparatus (200) derives the at least one data element (4, 4*a*, 4*b*, 4*c*) based on the at least one data structure (2, 2*a*, 2*b*, 2*c*).

M7. The method according to the preceding embodiment, wherein
- providing the at least one data element (4, 4*a*, 4*b*, 4*c*) to the data processing apparatus (200) comprises the user device (100) sending the at least one data structure (2, 2*a*, 2*b*, 2*c*) to the data processing apparatus (200) and the data processing apparatus (200) deriving the at least one data element (4, 4*a*, 4*b*, 4*c*) based on the at least one data structure (2, 2*a*, 2*b*, 2*c*).

M8. The method according to any of the preceding embodiments, wherein the method further comprises
- sending the at least one signed data element (46, 46*a*, 46*b*, 46*c*) from the data processing apparatus (200) to the user device (100).

M9. The method according to the preceding embodiment, wherein the method further comprises
- the user device (100) broadcasting the at least one signed data element (46, 46*a*, 46*b*, 46*c*) to a blockchain.

M10. The method according to the preceding embodiment, wherein the method further comprises
- the user device (100) broadcasting the at least one data structure (2, 2*a*, 2*b*, 2*c*) to the blockchain.

M11. The method according to any of the preceding embodiments, wherein the method further comprises
- the remote data processing system (300) performing a compliance check on each of the at least one data structure (2, 2*a*, 2*b*, 2*c*), and
- the remote data processing system (300) checking the remote authentication element (60, 42, 82).

M12. The method according to the preceding embodiment, wherein the method further comprises
- in response to a successful compliance check and a successful check of the remote authentication element (60, 42, 82), the remote data processing system (300) generating the signing element (62, 44, 84) and sending the signing element (62, 44, 84) to the user device (100).

M13. The method according to any of the preceding embodiments, wherein the at least one data structure (2, 2*a*, 2*b*, 2*c*) is a data structure (2) and the at least one data element (4, 4*a*, 4*b*, 4*c*) is a data element (4).

That is, the at least one data structure is a single data structure and the at least one data element is a single data element.

M14. The method according to the preceding embodiment,
- wherein the data processing apparatus (200) generating the remote authentication element (60, 42, 82) comprises the data processing apparatus (200) signing the data element (4) with a private remote access key (50), thereby generating a remote access data element (42) forming the remote authentication element (60).

M15. The method according to any of the preceding embodiments, wherein the data processing apparatus (200) comprises a secure portion.

M16. The method according to the preceding embodiment and with the features of the penultimate embodiment, wherein the private remote access key (50) is stored in the secure portion.

M17. The method according to any of the preceding embodiments with the features of embodiment M15, wherein the private signature key (58) is stored in the secure portion.

M18. The method according to any of the preceding embodiments, with the features of embodiment M13, wherein the signing element (62, 44, 84) is an issuer signed data element (44) obtained by signing the data element (4) with an issuer private key (54).

M19. The method according to the preceding embodiment, wherein the data processing apparatus (200) comprises an issuer public key (56) corresponding to the issuer private key (54), and wherein evaluating the signing element (44) comprises checking with the issuer public key (56) whether the issuer signed data element (44) is the data element (4) signed with the issuer private key (54).

M20. The method according to the preceding embodiment and with the features of embodiment M15, wherein the issuer public key (56) is stored in the secure portion.

M21. The method according to any of the preceding embodiments with the features of embodiments M11 and M14, wherein the method further comprises the remote data processing system (300) deriving the data element (4) from the data structure (2).

M22. The method according to the preceding embodiment, wherein the remote data processing system (300) comprises a public remote access key (52) corresponding to the private remote access key (50), and wherein the remote data processing system (300) checking the remote authentication element (60, 42, 82) comprises the remote data processing system (300) checking with the public remote access key (52) whether the remote access data element (42) is the data element (4) signed with the private remote access key (50).

M23. The method according to any of the 2 preceding embodiments and with the features of embodiments M12 and M18, wherein the remote data processing system (300) generating the signing element (62, 44, 84) comprises the remote data processing system (300) signing the data element (4) with the issuer private key (54) to thereby generate the issuer signed data element (44).

M24. The method according to any of the preceding embodiments when not dependent on embodiment M13, wherein the at least one data structure (2, 2_a_, 2_b_, 2_c_) is a plurality of data structures (2_a_, 2_b_, 2_c_) and the at least one data element (4, 4_a_, 4_b_, 4_c_) is a plurality of data elements (4_a_, 4_b_, 4_c_).

M25. The method according to the preceding embodiment and with the features of embodiment M3, wherein the method further comprises providing a meta data element (8) to the data processing apparatus (200), wherein the meta data element (8) is generated by concatenating the data elements (4_a_, 4_b_, 4_c_) and deriving the meta data element (8) based on the concatenated data elements (4_a_, 4_b_, 4_c_).

Overall, it should be understood that the meta data element can be provided to the data processing apparatus by the meta data element being generated on the data processing apparatus, or by the meta data element being generated elsewhere (e.g., in the user device) and then being sent to the data processing apparatus.

M26. The method according to the preceding embodiment, wherein concatenating the data elements (4_a_, 4_b_, 4_c_) is performed by the user device (100).

M27. The method according to the preceding embodiment, wherein deriving the meta data element (8) is performed by the user device (100).

M28. The method according to embodiment M25 or M26, wherein deriving the meta data element (8) is performed by the data processing apparatus (200).

M29. The method according to embodiment M28, or the preceding embodiment when not depending on M26, wherein concatenating the data elements (4_a_, 4_b_, 4_c_) is performed by the data processing apparatus (200).

M30. The method according to any of the preceding embodiments with the features of embodiment M25, wherein the data processing apparatus (200) generating the remote authentication element (82) comprises the data processing apparatus (200) signing the meta data element (8) with a private remote access key (50), thereby generating a remote access meta data element (82) forming the remote authentication element (60).

M31. The method according to the preceding embodiment and with the features of embodiment M15, wherein the private remote access key (50) is stored in the secure portion.

M32. The method according to any of the preceding embodiments with the features of embodiment M24, wherein the signing element (62, 44, 84) is an issuer signed meta data element (84) obtained by signing the meta data element (8) with an issuer private key (54).

M33. The method according to the preceding embodiment and with the features of embodiment M25, wherein the data processing apparatus (200) comprises an issuer public key (56) corresponding to the issuer private key (54), and wherein evaluating the signing element (84) comprises checking with the issuer public key (56) whether the issuer signed meta data element (84) is the meta data element (8) signed with the issuer private key (54).

M34. The method according to the preceding embodiment and with the features of embodiment M15, wherein the issuer public key (56) is stored in the secure portion.

M35. The method according to any of the preceding embodiments with the features of embodiments M11 and M24, wherein the method further comprises the remote data processing system (300) deriving the plurality of data elements (4_a_, 4_b_, 4_c_) from the plurality of data structures (2_a_, 2_b_, 2_c_), and the remote data processing system (300) concatenating the plurality of data elements (4_a_, 4_b_, 4_c_) and deriving the meta data element (8) based on the concatenated data elements (4_a_, 4_b_, 4_c_).

M36. The method according to the preceding embodiment, wherein the remote data processing system (300) comprises a public remote access key (52) corresponding to the private remote access key (50), and wherein the remote data processing system (300) checking the remote authentication element (60, 42, 82) comprises the remote data processing system (300) checking with the public remote access key (52) whether the remote access meta data element (82) is the meta data element (4) signed with the private remote access key (50).

M37. The method according to any of the 2 preceding embodiments and with the features of embodiments M12 and M32, wherein the remote data processing system (300) generating the signing element (62, 44, 84) comprises the remote data processing system (300) signing the meta data element (8) with the issuer private key (54) to thereby generate the issuer signed meta data element (84).

M38. The method according to any of the preceding embodiments, wherein the data processing apparatus (200) is a smart card.

M39. The method according to any of the preceding embodiments, wherein the user device (100) and the data processing apparatus (100) communicate with each other via near field communication.

S1. A system configured to perform the method according to any of the preceding embodiments, wherein the system comprises the user device (100) and the data processing apparatus (200).

It should be understood that when a system is said to be configured to perform the method discussed above, this means that the components of the system are programmed to perform the respective steps of the method.

S2. The system according to the preceding embodiment, wherein the system comprises the remote data processing system (300).

Embodiments of present technology will now be described with reference to the accompanying drawings, which should only exemplify, but not limit, the present invention.

Figure 3A:
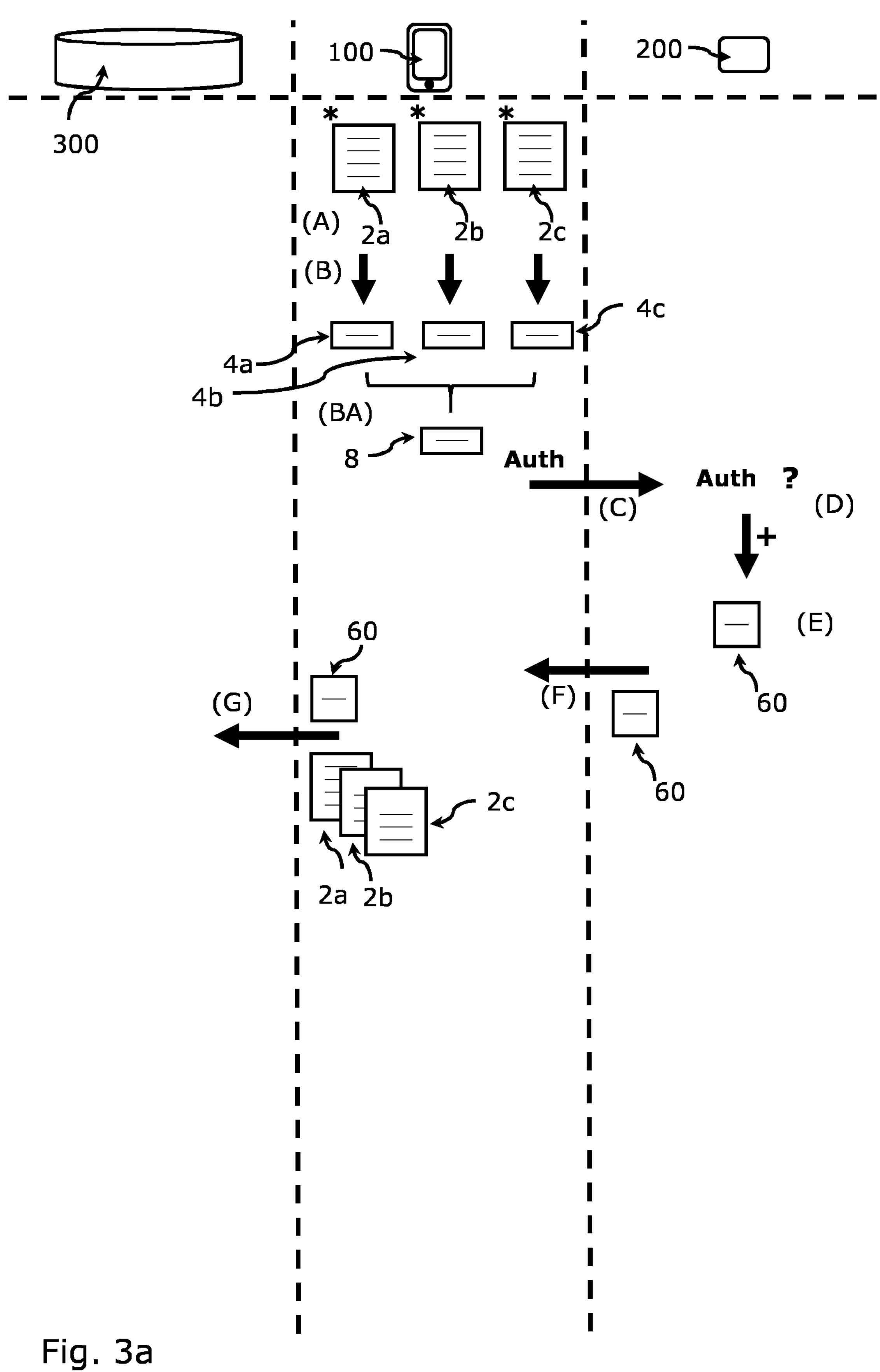
Figure 3B:
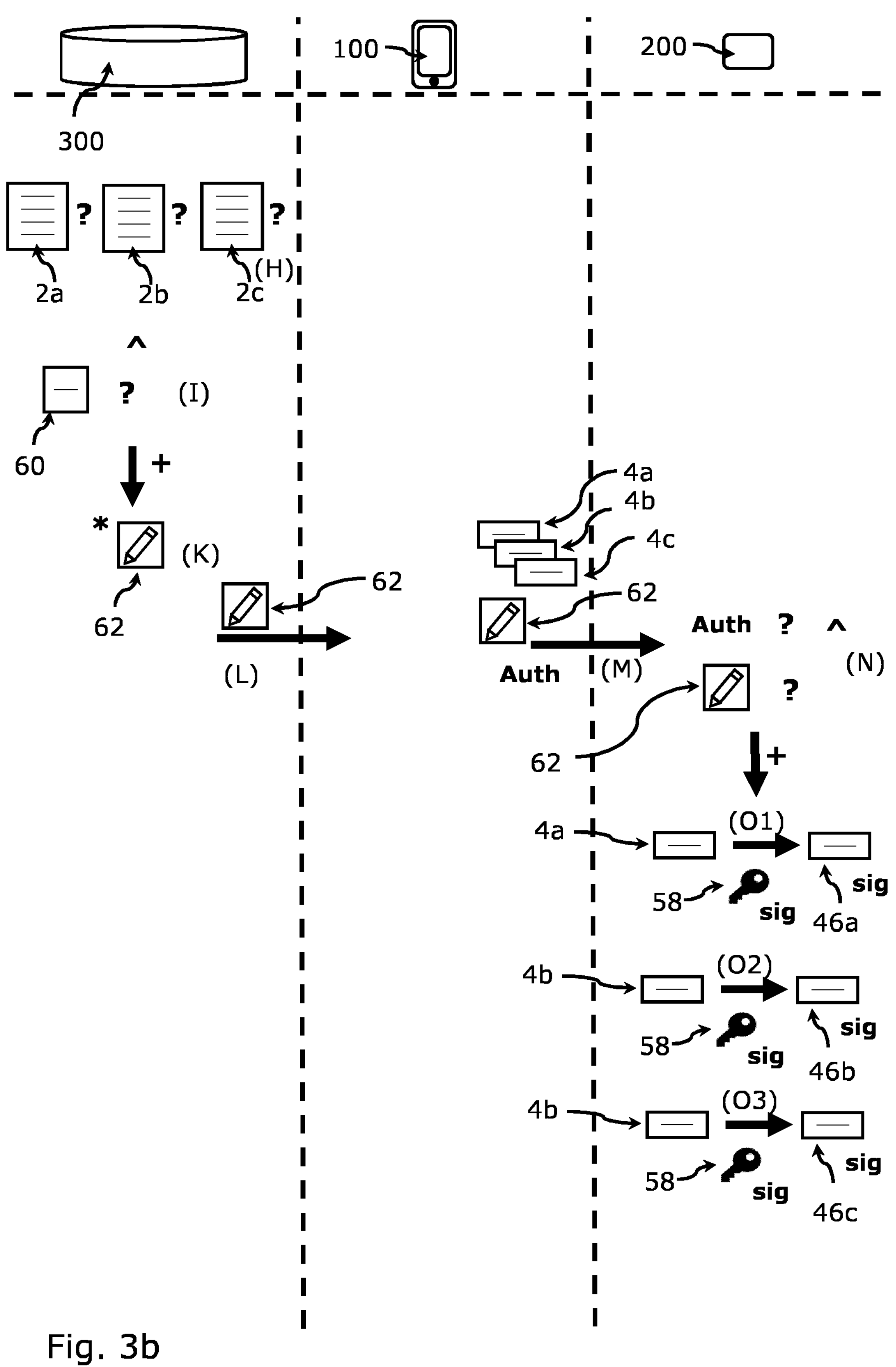
Figure 3C:
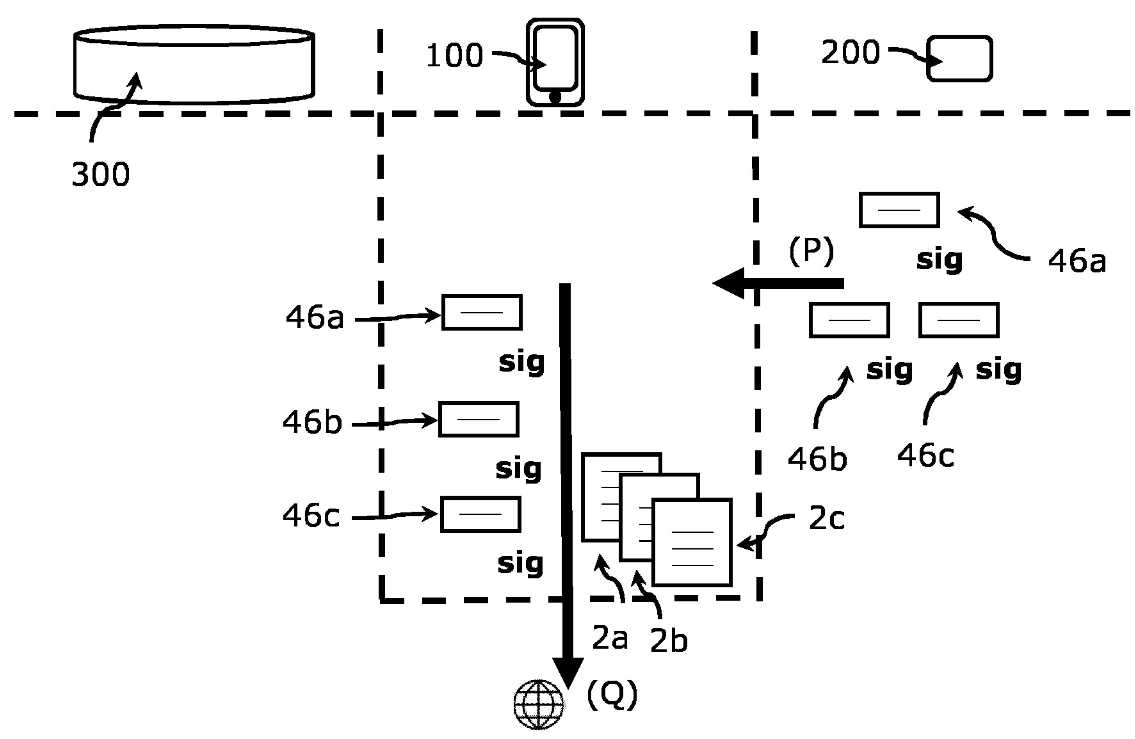
Figure 4A:
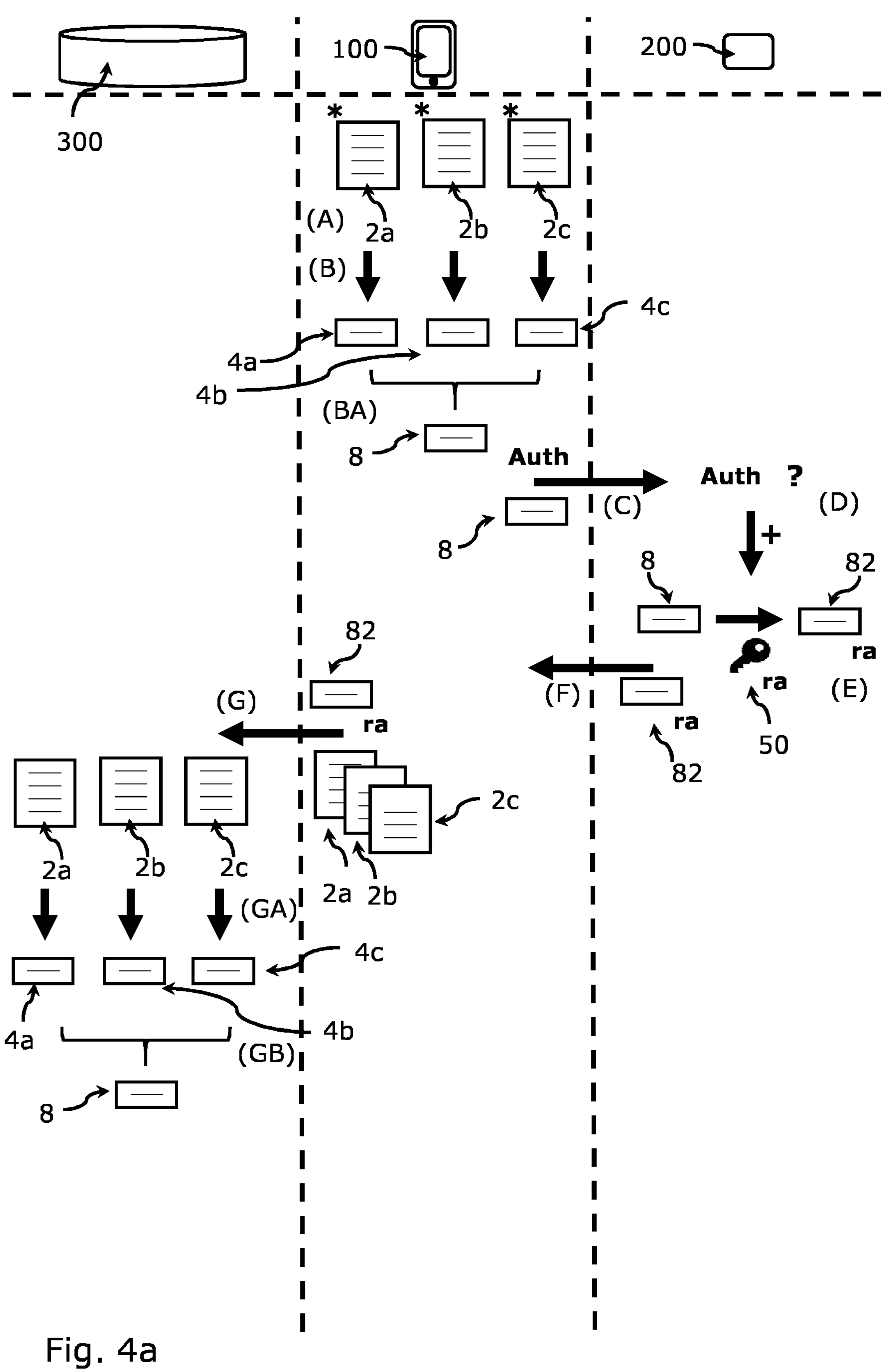
Figure 4B:
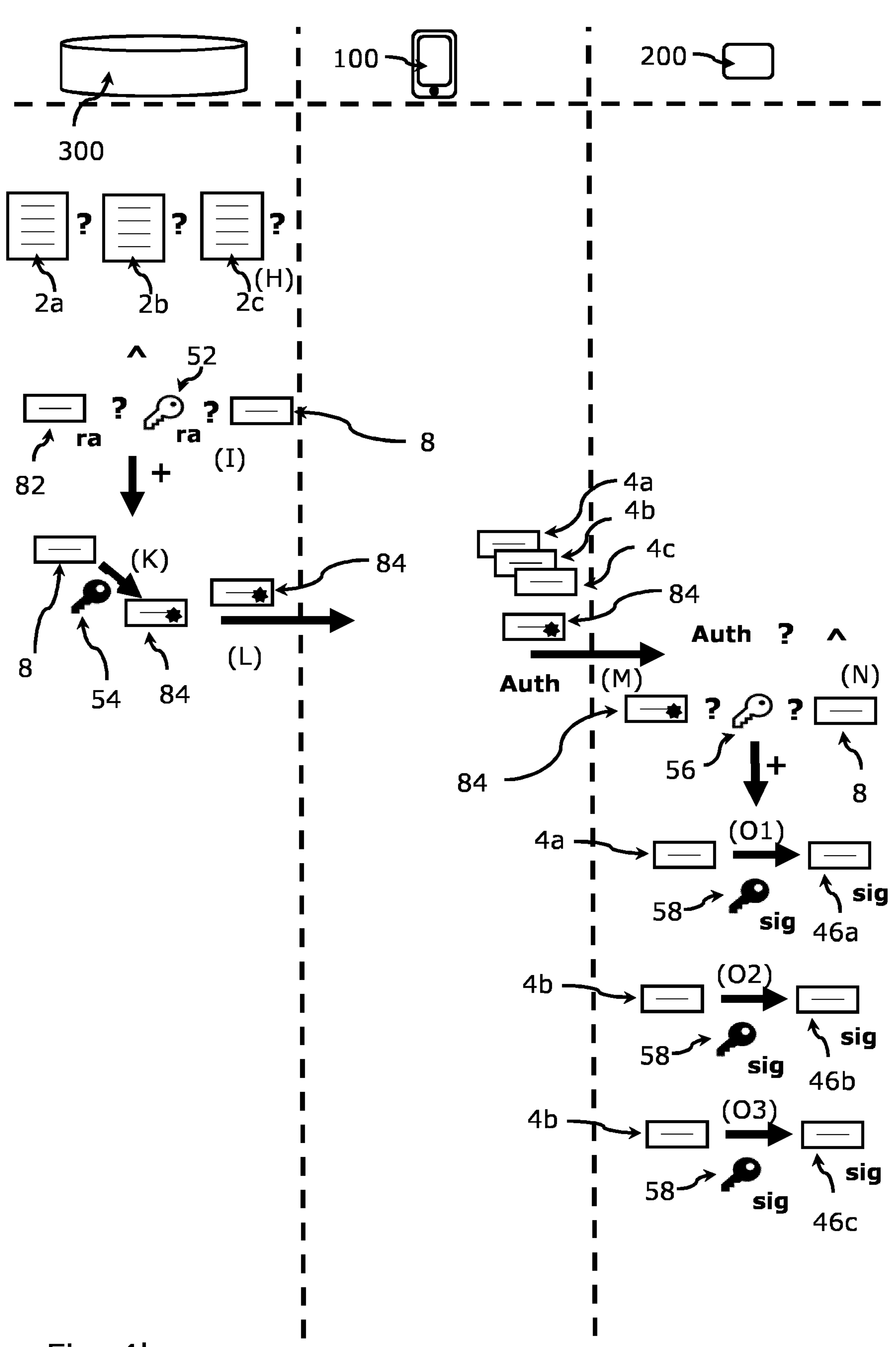
Figure 4C:
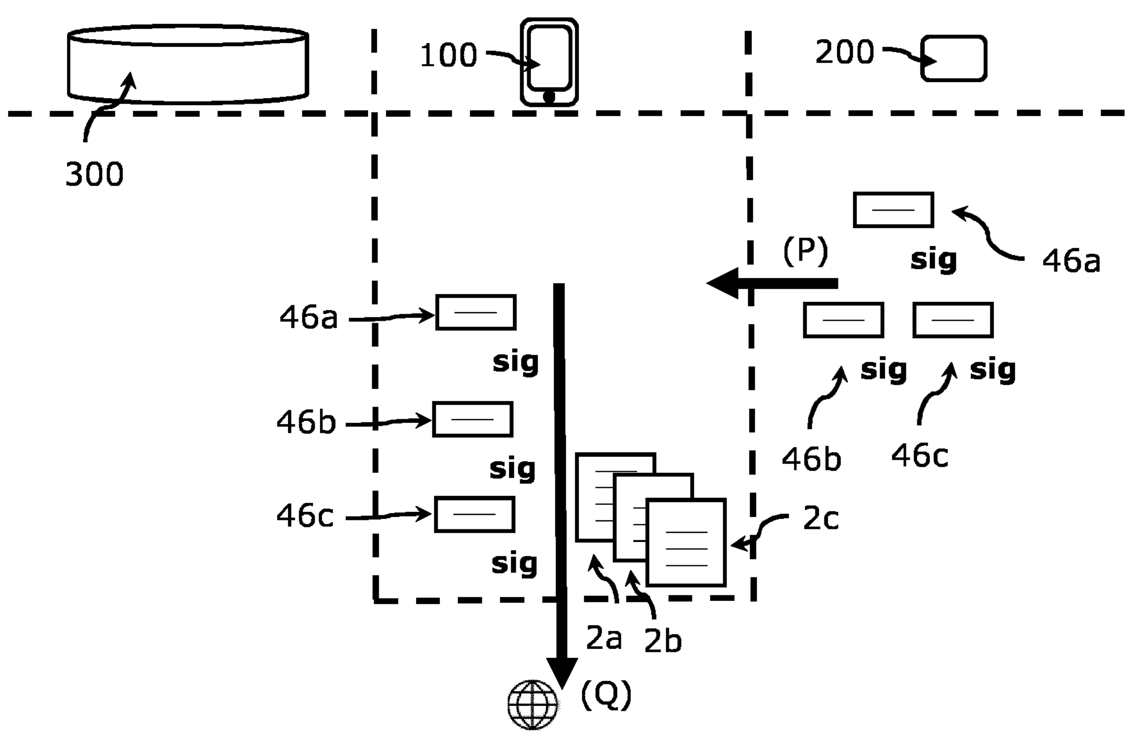

FIGS. 3*a* to 3*c* depict a method for digital signing according to a still further embodiments of the present invention; and FIGS. 4*a* to 4*c* depict a method for digital signing according to a still further embodiments of the present invention.

Figure 1:
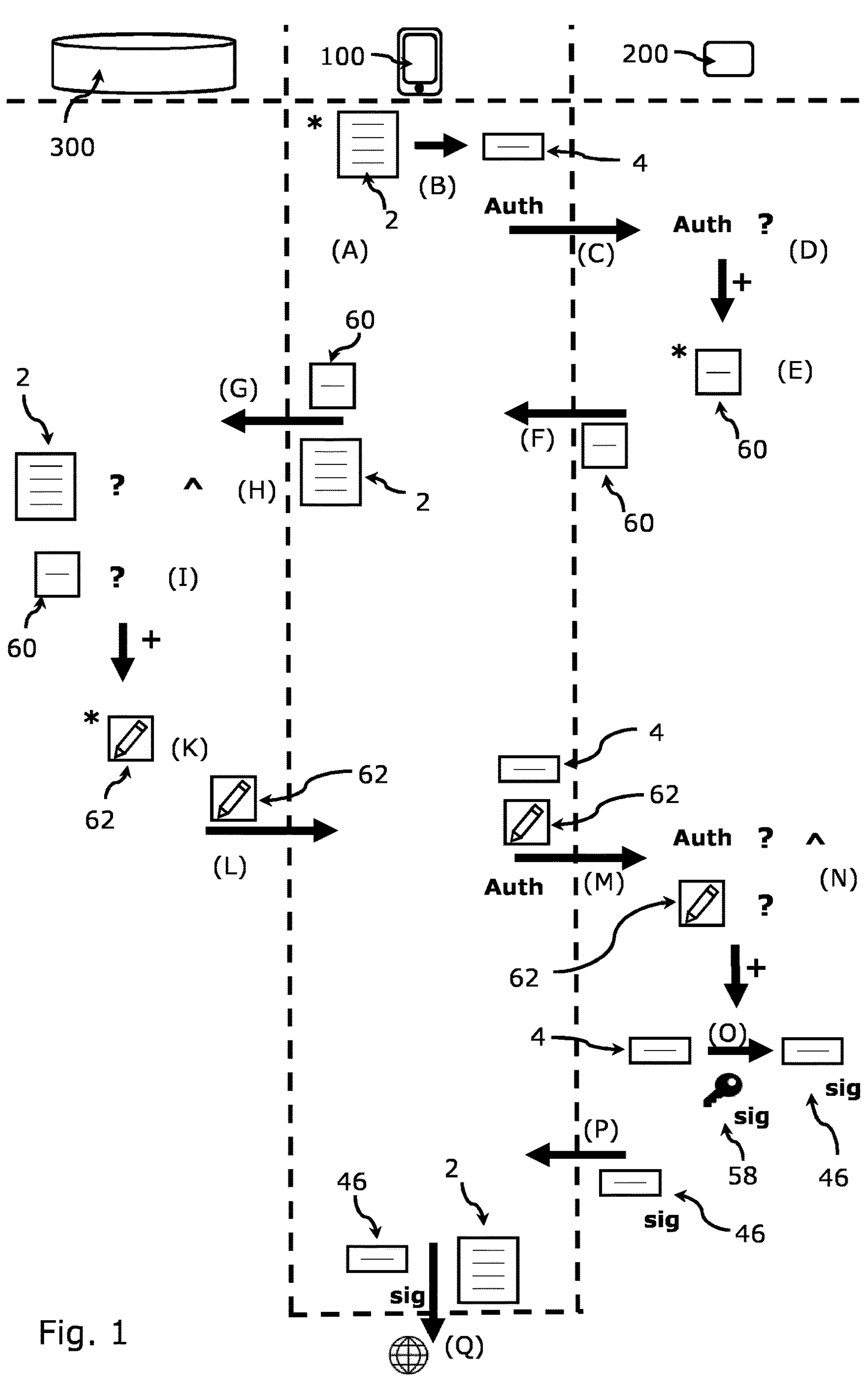
FIG. 1 depicts a method for digital signing according to an embodiment of the present invention.

FIG. 1 depicts an embodiment of a method and a system according to the present invention. More particularly, FIG. 1 depicts three panels, each indicating steps that are performed by different apparatuses. The left panel corresponds to steps performed by a remote data processing system 300, the center panel corresponds to steps performed by a user device 100, and the right panel corresponds to steps performed by a data processing apparatus 200. Arrows crossing lines between the different panels indicate that data is sent from one apparatus to another. It should be understood that each of the remote data processing system 300, the user device 100 and the data processing apparatus 200 comprises a memory and a data processor.

Overall, embodiments of the present technology relate to generating a signed data element, e.g., signing a data element being indicative for a transaction of a crypto asset.

In an initial step (A), the user device 100, which may also be referred to as a user terminal 100, may generate a data structure 2, e.g., a data structure relating to all the transaction data for a transaction of a crypto asset.

The user device 100 may also calculate a data element 4 derived from the data structure 2 in a step (B). In particular, the data element 4 may be a hash of the data structure 2.

The user device 100 may generally communicate with the data processing apparatus 200, e.g., by near field communication. The data processing apparatus 200 may be a smart card comprising a secure portion.

To enable functionality of the data processing apparatus 200, an authentication may be required. More particularly, the authentication may be entered into the user device 100 and then forwarded to the data processing apparatus 200 for checking. As an example, a user may enter a personal identification number (PIN) into the user device 100 and the PIN may then be sent to the data processing apparatus 200.

Generally, in a step (C), an authentication Auth may be sent from the user device 100 to the data processing apparatus 200. Optionally, in this step, also the data element 4 is sent from the user device 100 to the data processing apparatus 200.

It will be understood that the usage of a PIN is simply exemplary and that in fact, any other authentication method may be used to access the data processing apparatus 200 and particularly the secure portion thereof. Other examples for the authentication are a challenge response, or usage of authentication keys. In case of authentication keys, the data element 4 may be signed with a private authentication key in the user device 100 and more particularly in a secure section of the user device 100 to thus generate an authentication data element corresponding to the authentication Auth that is send to the data processing apparatus 200 together with the unsigned data element 4. As a further option, also biometric authentication may be used as Auth.

In a step (D), the data processing apparatus 200 checks whether the authentication is successful. In the case of authentication keys, the data processing apparatus 200 comprises a public authentication key corresponding to the private authentication key. The data processing apparatus can then check by using the public authentication key and the unsigned data element 4 (which, in this embodiment was also sent in step (C)) whether the authentication data element is the data element signed by the private authentication key. More particularly, in this case, the data processing apparatus 200 can derive the authentication public key by using the authentication data element and the unsigned data element and can compare the authentication public key with the authentication public key stored in the data processing apparatus. In case of a PIN, the PIN will be checked in step (D).

If the authentication is successful, in a step (E), the data processing apparatus 200 generates a remote authentication element 60 in the secure portion. The remote authentication element 60 enables a functionality of the remote data processing system 300, and the remote authentication element 60 may be realized as a PIN, a password, it may be based on a challenge response, it may be a hash-based message authentication code (HMAC), or a data element signed by a private remote access key.

The remote authentication element 60 is then sent (see step (F)) from the data processing apparatus 200 to the user device 100.

In a step (G), the user device 100 sends the remote authentication element 60 and the data structure 2 to the remote data processing system 300.

The remote data processing system 300 may perform two checks. In a first check (H), the data structure 2 is checked as to whether it is fully compliant for it to be carried out. It will be understood that the data structure may indicate a transaction of a crypto asset with a particular value (e.g., 10 Bitcoin) from a first address to a second address. In the first check (H), compliance of the data structure 2 with different rules may be checked. For example, it may be possible that certain users are banned from particular transactions. For example, certain recipient addresses may be banned from receiving Bitcoins. If, for example, the data structure 2 indicates such a banned recipient address, the first check (H) will fail. If, however, the data structure 2 is fully compliant with all regulations, the first check (H) succeeds.

In the second check (I), the remote authentication element 60 is checked. Again, the remote authentication element 60 may be, e.g., a PIN, a password, it may be based on a challenge response, it may be a hash-based message authentication code, or a data element signed by a remote private remote access key. The remote data processing system 300 is configured to check a validity of the remote authentication element 60.

If both checks (H) and (I) are successful, the remote data processing system 300 generates a signing element 62. The signing element 62 is configured to instruct the data processing apparatus 200 to sign a data element.

The signing element 62 is sent from the remote data processing system 300 to the user device 100 in step (L).

In a step (M), the signing element 62 is sent from the user device 100 to the data processing apparatus 200. In this step, also an authentication Auth may be sent from the user device 100 to the data processing apparatus 200.

Furthermore, also the data element 4 is sent from the user device 100 to the data processing apparatus 200, and it should be understood that this sending of the data element 4 from the user device 100 to the data processing device 200 may be performed simultaneously with sending the signing element 62, i.e., it may be part of step (M). However, the data element 4 may also be sent from the user device 100 to the data processing apparatus 200 at a different time, e.g., in step (C).

As in step (D), the authentication Auth may be checked on the data processing device 200 in a step (N). Furthermore, the signing element 62 may be evaluated in step (N). The signing element 62 can be, e.g., a data element signed in the remote data processing system 300 by a private key, where the data processing apparatus 200 has the corresponding public key, or it can be a hash-based message authentication code (HMAC).

If the check and evaluation (which may also be a check) in step (N) are successful, the data element 4 is signed by a private signature key 58, which may also be referred to as blockchain private key 58, in a step (O) to thus generate a signed data element 46. It should be understood that the private signature key 58 is in the secure portion of the data processing apparatus 200 and that thus, step (O) is performed in the secure portion.

For example, the data element 46 may be a hash of a transaction, which is signed by the private signature key 58. It may thus be used to transfer a crypto asset associated to the blockchain public key corresponding to the private signature key 58.

The signed data element 46 is then sent from the data processing apparatus 200 to the user device 100 in a step (P).

In a step (Q), the signed data element 46 may then be broadcasted from the user device 100, i.e., it may be output to the relevant blockchain. Optionally, also the complete data structure 2 may be output in this step (Q).

Figure 2:
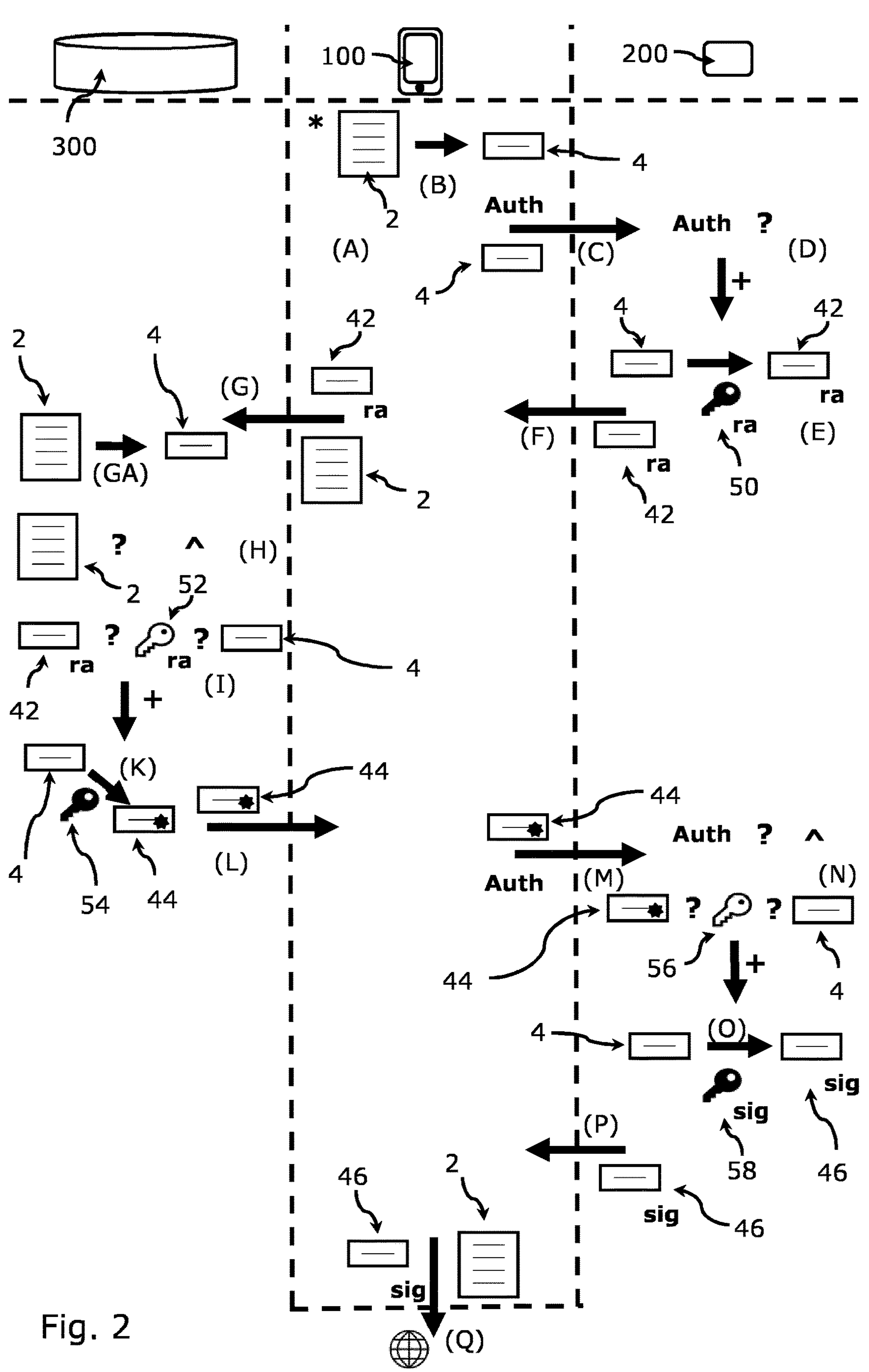
FIG. 2, depicts a method for digital signing according to a further embodiments of the present invention.

FIG. 2 depicts a method generally corresponding to the method depicted in FIG. 1 with additional details of how individual steps may be implemented. It will thus be understood that some of the steps depicted in FIG. 2 correspond to the steps depicted in FIG. 1 and described with reference to FIG. 1, and for those steps, reference is made to the description of FIG. 1.

While steps (A), (B), and (D) correspond to the steps described with reference to FIG. 1, further details are provided for steps (C) and (E) in FIG. 2. More particularly, in step (C), also the data element 4 which was derived from the data structure 2 is sent from the user device 100 to the data processing apparatus 200.

Further, in step (E), if the authentication is successful, the data processing apparatus 200 signs the data element 4 with a private remote access key 50 to thereby generate a remote access data element 42. It should be understood that the private remote access key 50 is stored in the secure portion of the data processing device 200 and that thus, step (E) is performed in the secure portion. That is, the remote access data element 42 in this embodiment corresponds to the remote authentication element 60 discussed with reference to FIG. 1.

It will thus be understood that in step (F), the remote access data element 42 is sent from the data processing apparatus 200 to the user device 100, and that in in step (G), the remote access data element 42 is sent from the user device 100 to the remote data processing system 300.

In a step (GA), the remote data processing system 300 may derive the data element 4 from the data structure 2, e.g., by generating the hash of the data structure 2.

Further, while step (H) of the embodiment of FIG. 2 is identical to the step (H) in FIG. 1, in step (I), the remote access data element 42 is checked. For this check, the remote access data element 42, a public key 52 corresponding to the private remote access key 50, and the data element 4 are used. The public key 52 may therefore also be referred to as public remote access key 52. It will be understood that the check (I) in this embodiments is successful if the remote data processing system 300 confirms that the remote access data element 42 is the data element 4 signed by the remote access private key 50.

If both checks (H) and (I) are successful, the remote data processing system 100 proceeds to step (K).

As described with reference to FIG. 1, in step (K), a signing element 62 is generated. In the embodiment depicted in FIG. 2, the signing element 62 is realized as an issuer signed data element 44. More particularly, in step (K) as depicted in FIG. 2, the remote data processing system 300 signs the data element 4 with an issuer private key 54 to thus generate an issuer signed data element 44 (which is the signing element 62 in this embodiment). In step (L) of FIG. 2, the issuer signed data element 44 is sent from the remote data processing system 300 to the user device 100.

In step (M), the issuer signed data element 44 is sent from the user device 100 to the data processing apparatus 200 together with an authentication Auth, and it will again be noted that in the embodiment of FIG. 2, the issuer signed data element 44 corresponds to the signing element 62 of FIG. 1. Further, it will be noted that in the embodiment of FIG. 2, in step (M), it is possible that the data element 4 is not sent to the data processing apparatus 200, as the data element 4 was already sent to the data processing apparatus 200 in step (C).

Again, in step (N), the authentication Auth may be checked. Further, also in this step (N), the issuer signed data element 44 (being the signing element 62) is checked. More particularly, in the embodiment of FIG. 2, the data processing device 200 may comprise an issuer public key 56 corresponding to the issuer private key 54. By means of this issuer public key 56, the data processing apparatus 200 may check whether the issuer signed data element 44 is the data element 4 that was signed by the issuer private key 54.

If the checks in step (N) are successful, the method proceeds to step (O) and the subsequent steps, which are identical to the steps described with reference to FIG. 1.

A further embodiment of the present technology is depicted in FIGS. 3*a* to 3*c*. The method depicted in FIGS. 3*a* to 3*c* mainly corresponds to the method depicted in FIG. 1. However, instead of a single data element 4 (e.g., a single hash of a data structure), a plurality of data elements 4*a*, 4*b*, 4*c* are signed. It will be understood that like reference numbers correspond to like features and steps.

In a step (A), a plurality of data structures 2*a*, 2*b*, 2*c* are generated by a user device 100. For example, each data structure 2*a*, 2*b*, 2*c* may be details of a transaction of a crypto asset. Thus, each data structure 2*a*, 2*b*, 2*c* may indicate, e.g., an address of a sender, an address of a recipient, a type and amount of a crypto asset to be transferred.

In step (B), for each of the data structures 2*a*, 2*b*, 2*c*, a data element 4*a*, 4*b*, 4*c* is derived by the user device 100. For example, each of the data elements 4*a*, 4*b*, 4*c* may be a hash of the respective data structure 2*a*, 2*b*, 2*c*.

In a step (BA), a meta data element 8 is derived based on the plurality of data elements 2*a*, 2*b*, 2*c*. For example, the data elements 4*a*, 4*b*, 4*c* may be concatenated, thus generating a concatenated data element, and the meta data element 8 may be a hash of the concatenated data element. While in the embodiment depicted in FIG. 3*a*, step (BA) is performed in user device 100, it should be understood that this is merely exemplary and that the step (BA) may also be performed elsewhere, e.g., in the data processing apparatus 200.

As in FIG. 1, an authentication Auth is sent from the user device 100 to the data processing apparatus 200 (step (C)), the authentication Auth is checked in the data processing apparatus 200 (step (D)), and upon a successful authentication, a remote authentication element 60 is generated in the data processing apparatus 200 (step (E)). Also as in FIG. 1, the remote authentication element 60 is sent from the data processing apparatus 200 to the user device 100 (step (F)).

In a step (G) mostly corresponding to step (G) of FIG. 1, the remote authentication element 60 and the plurality of data structures 2*a*, 2*b*, 2*c* are sent from the user device 100 to the remote data processing system 300.

Now referring to FIG. 3*b*, in a step (H) mostly corresponding to step (H) of FIG. 1, the remote data processing system 300 checks each of the data structures 2*a*, 2*b*, 2*c* for compliance with regulations.

In a step (I) corresponding to step (I) in FIG. 1, the remote data processing system 300 checks the remote authentication element 60.

If both checks (H) and (I) succeed, the method proceeds to step (K) corresponding to step (K) in FIG. 1, where a signing element 62 is generated in the remote data processing system 300. Also as in FIG. 1, the signing element 62 is sent from the remote data processing system 300 to the user device 100.

In step (M), the user device 100 sends the signing element 62 and an authentication Auth to the data processing apparatus 200. Furthermore, also the data elements 4*a*, 4*b*, 4*c* are sent from the user device 100 to the data processing apparatus 200. While FIG. 3*b* depicts that the data elements 4*a*, 4*b*, 4*c* are provided to the data processing apparatus 200 in step (M), it should be understood that this is merely exemplary and that in fact, the data elements 4*a*, 4*b*, 4*c* may also be provided to the data processing apparatus 200 at another stage, e.g., in step (C).

In a step (N) corresponding to step (N) of FIG. 1, the authentication Auth is checked in the data processing apparatus 200, and the signing element 62 is evaluated in the data processing apparatus.

If both are successful, the method proceeds to step (O), which in this case is denoted by sub steps (O1), (O2), (O3). More particularly, in step (O), each of the data elements 4*a*, 4*b*, 4*c* is signed with a private signature key 58 in the secure portion of the data processing apparatus 200, thereby generating signed data elements 46*a*, 46*b*, 46*c*.

Now referring to FIG. 3*c*, these signed data elements 46*a*, 46*b*, 46*c* are sent from the data processing apparatus 200 to the user device 100 in step (P).

In a step (Q), these signed data elements 46*a*, 46*b*, 46*c* are broadcasted from the user device 100, i.e., they are sent to the respective blockchains. Optionally, also the corresponding data structures 2*a*, 2*b*, 2*c* are output in this step.

Overall, it will be understood that the method described with references to FIGS. 3*a* to 3*c* thus allows a plurality of data elements 4*a*, 4*b*, 4*c* to be signed in a single method, thereby increasing efficiency of signing such data elements.

FIGS. 4*a* to 4*c* depict a still further embodiment of the present technology. Generally, it should be understood that the method in these Figures is one implementation of the multi signature method discussed in conjunction with FIGS. 3*a* to 3*c*. More particularly, these Figures depict an implementation of the multi signature method of FIGS. 3*a* to 3*c*, wherein further details are realized as discussed in conjunction with FIG. 2. Again, like reference numbers denote like features and steps throughout the Figures.

As regards steps (A), (B), and (BA) depicted in FIG. 4*a*, reference can be made to the description of FIG. 3*a*.

In step (C) of FIG. 4*a*, an authentication Auth and the meta data element 8 is sent from the user device 100 to the data processing apparatus 200.

After an authentication step (D) as before, the meta data element 8 is signed with a private remote access key 50 by the data processing apparatus 200 to thereby generate a remote access meta data element 82 (corresponding to the authentication element 60 in FIG. 3*a*).

In step (F), the remote access meta data element 82 is sent from the data processing apparatus 200 to the user 100, and in step (G), the data structures 2*a*, 2*b*, 2*c* and the remote access meta data element 82 are sent from the user device 100 to the remote data processing system 300.

In a step (GA) performed by the remote data processing system 300, for each of the data structures 2*a*, 2*b*, 2*c*, the corresponding data elements 2*a*, 2*b*, 2*c* are derived (e.g., by hashing), and in a step (GB) performed by the remote data processing system, the meta data element 8 is derived based on the data elements 2*a*, 2*b*, 2*c*.

Step (H) of FIG. 4*b* corresponds to step (H) of FIG. 3*b*.

In step (I) of FIG. 4*b*, the meta data element 8 that was derived by the data processing system 300 in steps (GA) and (GB) is used, as is a public remote access key 52 and the remote access meta data element 82. More particularly, it is checked with the public remote access key 52 whether the remote access meta data element 82 is the meta data element 8 signed by the private remote access key 50.

If both checks (H) and (I) are successful, the method proceedings to step (K).

In step (K) of FIG. 4*b*, the meta data element 8 is signed by a private issuer key 54, thereby generating an issuer signed meta data element 84 (forming the signing element 62 in this embodiment).

In step (L), the issuer signed meta data element 84 is sent from the remote data processing system 300 to the user device 100.

In step (M) depicted in FIG. 4*b* mostly corresponding to step (M) of FIG. 3*b*, an authentication Auth and the issuer signed meta data element 84 are sent from the user device 100 to the data processing apparatus 200.

Furthermore, also the data elements 4*a*, 4*b*, 4*c* are sent from the user device 100 to the data processing apparatus 200, where it will again be understood that they may be sent to the data processing apparatus 200 in step (M), but also at another time, e.g., in step (C).

In step (N) of FIG. 4*b*, the authentication Auth is checked. Further, in this step (N), it is also checked by means of an issuer public key 56, whether the issuer signed meta data element 84 is the meta data element 8 signed by the issuer private key 54. It will be understood that this check may be performed by means of a meta data element 8 that was sent to the data processing apparatus 200 (as in step (C) depicted in FIG. 4*a*). However, it is also possible that the meta data element 8 is not sent to the data processing apparatus 200, but that only the data elements 4*a*, 4*b*, 4*c* are sent to the data processing apparatus 200 and that the meta data element 8 is then derived from the data elements 4*a*, 4*b*, 4*c* in the data processing apparatus 200.

If the checks in step (N) succeed, the method proceeds to step (O) with its sub-steps (O1) to (O3) as discussed in conjunction with FIG. 3*b*. Also the steps (P) and (Q) of FIG. 4*c* are identical as in FIG. 3*c*, such that reference can be made to the description of FIG. 4*c*.

While in the above, preferred embodiments have been described with reference to the accompanying drawings, the skilled person will understand that these embodiments were provided for illustrative purpose only and should by no means be construed to limit the scope of the present invention, which is defined by the claims.

The invention claimed is:

1. A method for digital signing, wherein the method comprises:

sending an authentication from a user device to a data processing apparatus, the data processing apparatus checking the authentication, in response to the data processing apparatus successfully checking the authentication, the data processing apparatus generating a remote authentication element, the data processing apparatus sending the remote authentication element to the user device, the user device sending the remote authentication element and at least one data structure to a remote data processing system, the at least one data structure comprising transaction details of a crypto transaction, the user device receiving from the remote data processing system a signing element, the user device sending the signing element and a second authentication to the data processing apparatus, providing at least one data element to the data processing apparatus, wherein each data element comprises a hash of one of the at least one data structure, respectively, the data processing apparatus checking the second authentication and evaluating the signing element, and in response to the data processing apparatus successfully checking the second authentication and successfully evaluating the signing element, the data processing apparatus signing each of the at least one data element with a private signature key, thereby generating at least one signed data element.

2. The method according to claim 1, wherein the method further comprises:

the user device generating the at least one data structure, and deriving the at least one data element based on the at least one data structure, wherein the user device derives the at least one data element based on the at least one data structure, and wherein providing the at least one data element to the data processing apparatus comprises the user device sending the at least one data element to the data processing apparatus.

3. The method according to claim 1, wherein the method further comprises:

sending the at least one signed data element from the data processing apparatus to the user device, and the user device broadcasting the at least one signed data element to a blockchain.

4. The method according to claim 1, wherein the method further comprises:

the remote data processing system performing a compliance check on each of the at least one data structure, the remote data processing system checking the remote authentication element, and in response to a successful compliance check and a successful check of the remote authentication element, the remote data processing system generating the signing element and sending the signing element to the user device.

5. The method according to claim 1, wherein the data processing apparatus comprises a secure portion and wherein the private signature key is stored in the secure portion.

6. The method according to claim 5, wherein the data processing apparatus comprises a smart card.

7. The method according to claim 1, wherein the at least one data structure is a data structure and the at least one data element is a data element, and wherein the data processing apparatus generating the remote authentication element comprises the data processing apparatus signing the data element with a private remote access key, thereby generating a remote access data element forming the remote authentication element, wherein the private remote access key is stored in the secure portion.

8. The method according to claim 7, wherein the signing element is an issuer signed data element obtained by signing the data element with an issuer private key, and wherein the data processing apparatus comprises an issuer public key corresponding to the issuer private key, and evaluating the signing element comprises checking with the issuer public key whether the issuer signed data element is the data element signed with the issuer private key.

9. The method according to claim 1, wherein the method further comprises:

the remote data processing system performing a compliance check on each of the at least one data structure, the remote data processing system checking the remote authentication element, and in response to a successful compliance check and a successful check of the remote authentication element, the remote data processing system generating the signing element and sending the signing element to the user device, wherein the at least one data structure is a data structure and the at least one data element is a data element, wherein the data processing apparatus generating the remote authentication element comprises the data processing apparatus signing the data element with a private remote access key, thereby generating a remote access data element forming the remote authentication element, wherein the private remote access key is stored in the secure portion, and wherein the method further comprises the remote data processing system deriving the data element from the data structure, wherein the remote data processing system comprises a public remote access key corresponding to the private remote access key, and wherein the remote data processing system checking the remote authentication element comprises the remote data processing system checking with the public remote access key whether the remote access data element is the data element signed with the private remote access key, wherein the remote data processing system generating the signing element comprises the remote data processing system signing the data element with the issuer private key to thereby generate the issuer signed data element.

10. The method according to claim 1, wherein the at least one data structure is a plurality of data structures and the at least one data element is a plurality of data elements, wherein the method further comprises:

deriving the at least one data element based on the at least one data structure, and providing a meta data element to the data processing apparatus, wherein the meta data element is generated by concatenating the data elements and deriving the meta data element based on the concatenated data elements.

11. The method according to claim 10, wherein concatenating the data elements is performed by the user device, and wherein deriving the meta data element is performed by the user device.

12. The method according to claim 10, wherein the data processing apparatus comprises a secure portion and wherein the private signature key is stored in the secure portion, and wherein the data processing apparatus generating the remote authentication element comprises the data processing apparatus signing the meta data element with a private remote access key, thereby generating a remote access meta data element forming the remote authentication element, wherein the private remote access key is stored in the secure portion.

13. The method according to claim 10, wherein the signing element is an issuer signed meta data element obtained by signing the meta data element with an issuer private key, wherein the data processing apparatus comprises an issuer public key corresponding to the issuer private key, and wherein evaluating the signing element comprises checking with the issuer public key whether the issuer signed meta data element is the meta data element signed with the issuer private key.

14. The method according to claim 13, wherein the method further comprises:

the remote data processing system performing a compliance check on each of the at least one data structure, the remote data processing system checking the remote authentication element, in response to a successful compliance check and a successful check of the remote authentication element, the remote data processing system generating the signing element and sending the signing element to the user device, the remote data processing system deriving the plurality of data elements from the plurality of data structures, and the remote data processing system concatenating the plurality of data elements and deriving the meta data element based on the concatenated data elements, wherein the remote data processing system comprises a public remote access key corresponding to the private remote access key, wherein the remote data processing system checking the remote authentication element comprises the remote data processing system checking with the public remote access key whether the remote access meta data element is the meta data element signed with the private remote access key, and wherein the remote data processing system generating the signing element comprises the remote data processing system signing the meta data element with the issuer private key to thereby generate the issuer signed meta data element.

15. A system configured to perform the method according to claim 1, wherein the system comprises the user device and the data processing apparatus.

16. The system according to claim 15, wherein the system further comprises the remote data processing system.

* * * * *